United States Patent [19]

Murakami et al.

[11] 4,228,222

[45] Oct. 14, 1980

[54] HEAT-SENSITIVE RECORD MATERIAL

[75] Inventors: Takeshi Murakami, Osaka; Teruo Nakamura; Hisanori Yagi, both of Hyogo, all of Japan

[73] Assignee: Kanzaki Paper Manufacturing Co., Ltd., Tokyo, Japan

[21] Appl. No.: 22,866

[22] Filed: Mar. 21, 1979

[30] Foreign Application Priority Data

Mar. 28, 1978 [JP] Japan .................................. 53-36397

[51] Int. Cl.[2] ......................... B32B 27/00; B41M 5/18

[52] U.S. Cl. ..................................... 428/500; 427/148; 427/150; 427/261; 428/199; 428/207; 428/913

[58] Field of Search ............... 428/500, 913, 199, 207; 427/261, 148, 150; 282/27.5

[56] References Cited

U.S. PATENT DOCUMENTS

| | | | |
|---|---|---|---|
| 3,874,895 | 4/1975 | Hayashi et al. | 428/199 X |
| 3,950,595 | 4/1976 | Tanaka et al. | 428/199 |

FOREIGN PATENT DOCUMENTS 52-145228 12/1977 Japan .

*Primary Examiner*—Thomas J. Herbert, Jr.

*Attorney, Agent, or Firm*—Morgan, Finnegan, Pine, Foley & Lee

[57] ABSTRACT

The heat-sensitive record material comprises a base sheet and a color developing layer formed on at least one surface of said base sheet, said color developing layer comprising electron donating color forming material and acceptor reactive with said color forming material to develop a color, said color developing layer further including as a binder water soluble resinous material having carboxyl radicals, partly in the form of magnesium salt and partly in the form of another salt.

14 Claims, No Drawings

HEAT-SENSITIVE RECORD MATERIAL

BACKGROUND OF THE INVENTION

This invention relates to a heat-sensitive record material and particularly to a heat-sensitive record material which has improved water resistance and is adapted for a high speed and unremitting recording so that it may find its usefulness as a recording medium for information machines and instruments such as facsimiles, electronic computers and telex machines.

There is known a heat-sensitive record material comprising a base sheet having a color developing layer which includes finely divided particles of one of electron donating color forming materials (hereinafter referred as "color former") and finely divided particles of one of electron accepting reactant materials (hereinafter referred as "acceptor"). In such the heat-sensitive record material like this the above-mentioned two kinds of particles are, when at least one of them is melted or sublimated at an elevated temperature, brought into intimate contact with each other to develop a color.

The color developing layer of the above-mentioned heat-sensitive record material further includes as a binder, polyvinyl alcohol, methyl cellulose, hydroxylcellulose starch, gum arabic, gelatin, styrene maleic anhydride copolymer, acrylic acid resin, etc. Since those compounds are water-soluble binders, use of them involves a disadvantage that the color developing layer shows poor water resistance. Accordingly, when the color developing layer of the heat-sensitive record material is attacked by water, the coating layer is destroyed or soiled by dissolving. Another disadvantage involved is that the thermal head for applying heat to the heat-sensitive record material is stuck on the surface of the heat-sensitive record material. This "sticking" causes the recording to become discontinuous or intermittent and is liable to damage the thermal head.

Various attempts have been made to overcome the above-mentioned disadvantages. In many cases, those attempts involve new disadvantages and accordingly are not always successful to completely solve the problems. For example, Japanese Published Unexamined Patent Applications Nos. 49-32,646, 49-36,343 and 50-30,539 proposes to use compounds having at least two ethylene imine radicals or 1,2 epoxy ring as a water-resisting agent for the water soluble binder. The water resistance obtained with use of such compounds like these is unstable and unsatisfactory, because the cross linking reaction between the water-soluble binder and such the water-resisting agent cannot be proceeded with under such the low temperature drying condition as is required for the production of the heat-sensitive record material described. In addition, in some cases, the cross linking reaction makes the binder film heat-softenable with the result of making the color developing layer much sticky.

Another attempt was made to utilize metal compounds as a cross linking agent for a water soluble binder having carboxyl radicals, e.g. as disclosed in Japanese Published Unexamined Patent Application No. 52-145,228. Though this method does not make the binder film heat-softenable by the cross linking reaction, the water resistance qualities obtained are not unstable and unsatisfactory since the cross linking reaction cannot be proceeded with under such the low temperature drying conditions as required for the production of the heat-sensitive record material as well. The principal object of this invention is to provide a heat-sensitive record material in which the above-mentioned disadvantages are improved and which has good water resistance qualities and is adapted for a high speed and unremitting recording.

Other objects and advantages of the invention will be apparent from the following detailed description.

SUMMARY OF THE INVENTION

The heat-sensitive record material according to the invention comprises a base sheet and a color developing layer formed on at least one surface of said base sheet, said color developing layer comprising color former and acceptor which is reactive with said color former to develop a color. The color developing layer further includes as a binder water-soluble resinous material having carboxyl radicals, said carboxyl radicals being by at least 35% of its total amount neutralized by alkaline materials to form magnesium salt and at least one other salt which is a member selected from the group consisting of sodium salt, potassium salt, ammonium salt and amine salt, 30 to 80% of the total carboxyl radicals existing in the form of magnesium salt and 5 to 70% of the total carboxyl radicals existing in the form of another salt.

Preferably the water soluble resinous material having the above mentioned carboxyl radicals is a copolymer obtained by copolymerization of at least one of ethylenic monomers and conjugated diolefinic monomers and at least one unsaturated carboxylic acid. 30 to 70% by weight of the copolymer may preferably consist of unsaturated carboxylic acid component.

DETAILED DESCRIPTION OF THE INVENTION

Water-soluble resinous materials useful for the invention may preferably obtained by copolymerizing at least one of ethylenic monomers and conjugated diolefinic monomers with at least one unsaturated carboxylic acid. Among the useful ethylenic monomers, there are included monomers having 2 to 25 carbon atoms such as linear or branched olefins, e.g., ethylene, propylene, butylene, etc.; aromatic vinyl compounds, e.g., styrene, vinyl toluene, halogen-substituted styrene, etc.; vinyl cyanide compounds, e.g., acrylonitrile, methacrylonitrile, etc.; alkyl acrylates and methacrylates, e.g., methylacrylate, butyl acrylate, methyl methacrylate, etc.; vinyl ethers, e.g., isopropyl vinyl ether, methyl vinyl eter, etc.; vinyl halides, e.g., vinyl chloride, vinylidene chloride, etc.; and vinyl acetate. There are preferably used linear or branched olefins, aromatic vinyl compounds, alkyl acrylates and methacrylates. Particularly ethylene, styrene, methylacrylate, butyl acrylate and methyl methacrylate are most preferably used. Among the conjugated diolefinic monomers, there are included monomers having 4 to 10 carbon atoms such as butadiene, isoprene, chloroprene, piperylene etc. Butadiene is most preferably used. Among the useful unsaturated carboxylic acids, there are included acrylic acid, methacrylic acid, crotonic acid, itaconic acid, maleic acid, fumaric acid etc. Acrylic acid, methacrylic acid and maleic acid are preferably used. When the amount of the unsaturated carboxylic acid copolymerized is less than 30% by weight on the basis of that of the copolymer, the coating film of the copolymer is soft and sticky. On the other hand, when the amount of the unsaturated carboxylic acid is more than 70% by weight, the coating film becomes very hard to produce a roughened color developing layer and to degrade the quality of the resultant heat-sensitive record material. Accordingly, the copolymer comprising 30% to 70% by weight of the unsaturated carboxylic acid unit is preferably used.

As described above, according to the invention, water soluble resinous materials having carboxyl radicals are used. In order to achieve the advantages aimed by the invention, it is essential that the carboxyl radicals of the water-soluble resinous material are wholely or partly by at least 35% of its total amount, neutralized by alkaline materials. The salt produced by neutralization must be a magnesium salt with and at least one another salt which is a member selected from the group consisting of sodium salt, potassium salt, ammonium salt and amine salt. The preferred another salt is sodium salt or potassium salt. The carboxyl radicals existing in the form of magnesium salt must be within the range of 30 to 80%, preferably 40 to 70% of the total carboxyl radicals and the carboxyl radicals existing in the form of another salt must be within the range of 5 to 70% of the total carboxyl radicals.

If the carboxyl radicals of the water-soluble resinous material are neutralized by more than 90%, preferably, more than 95% of its total amount, the so-called "fogging" or undesired incidental color developing can be prevented in addition to the above mentioned improvement in the water resistance and the continuous recordability.

It is known to use as a binder sodium salts or ammonium salts of copolymers having carboxylic radicals. However, it has never been proposed to use a copolymer in which the carboxyl radicals are neutralized in the above specified manner to improve the water resistance and the continuous recordability of the resultant record material.

The above specified water-soluble resinous material may be added in the color developing layer in an amount of 10 to 40% preferably 15 to 30% by weight on dry basis of the total amount of the solid components of the color developing layer. The other usual binders such as polyvinyl alcohol, methylcellulose, hydroxyethylcellulose, styrene-butadiene latex and the like may also be added, if required and in an amount within such the range as not sacrificing the advantages obtained according to the invention. There is no limitation about the amount of the other binders used but usually it will be within the range of two parts by weight or less, preferably one part by weight or less per part by weight of the specified water-soluble resinous material.

Among examples for the combination of color former and acceptor included in the color developing layer according to the invention, there are included the combination of basic colorless chromogenic material with inorganic or organic acidic material and the combination of metal salt of long chain fatty acid, e.g., ferric stearate, ferric myristate and the like with phenol, e.g., tannic acid, gallic acid and the like. The former combination is preferred for obtaining stable record images.

Any of various known colorless chromogenic materials may be used for the present invention. Among them there are included, by way of examples, 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis-(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethylaminophthalide, 4,4'-bis-dimethylaminobenzhydrinebenzylether, N-halophenyl-leucoauramine, N-2,4,5-trichlorophenyl-leucoauramine, rhodamine-B-anilinolactam, rhodamine-(p-nitroanilino)lactam, rhodamine-(p-chloroanilino)lactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,3-dimethylfluoran, 7-diethylamino-(3-acetylmethylamino)fluoran, 7-diethylamino-(3-methylamino) fluoran, 3,7-diethylaminofluoran, 7-diethylamino-3-(dibenzylamino)fluoran, 7-diethylamino-3-(methylbenzylamino) fluoran, 7-diethylamino-3-(chloroethylmethylamino)fluoran, 7-diethylamino-3-(diethylamino)fluoran, 2-phenylamino-3-methyl-6-(N-ethyl-N-p-toluyl)amino-fluoran, benzoylleucomethylene blue, p-nitrobenzyl-leucomethylene blue, 3-methyl-spirodinaphtopyrane, 3-ethyl-spirodinaphthopyrane, 3,3'-dichloro-spirodinaphthopyrane, 3-benzylspiro-dinaphthopyrane, 3-methyl-naphtho-(3-methoxy-benzo)-spiropyrane and 3-propyl-spiro-dibenzopyrane. The above colorless chromogenic materials may be used either solely or in combination.

The acidic material as acceptor may be either or organic or inorganic. Among organic acidic materials as acceptor there are included phenolic compounds, aromatic carboxylic acids and their polyvalent metal salt.

Typical phenolic compounds which can be used as acceptor are: 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylene-bis(4-methyl-6-tert-isobutylphenol), 4,4'-isopropylidene-bis-(2-tert-butylphenol), 4,4'-sec-butylidenediphenol, 4-phenylphenol, 4,4'-isopropylidenediphenol(bisphenol A), 2,2'-methylene-bis(4-chlorophenol), hydroquinone, 4,4'-cyclohexylidenediphenol, novolak phenol resin and other phenol polymers.

Typical aromatic carboxylic acids which can be used as acceptor are: aromatic carboxylic acids, for example, benzoic acid, o-toluylic acid, m-toluylic acid, p-toluylic acid, p-tert-butylbenzoic acid, o-chlorobenzoic acid, p-chlorobenzoic acid, dichlorobenzoic acid, trichlorobenzoic acid, phthalic acid, isophthalic acid, terephthalic acid, 2-carboxybiphenyl, 3-carboxybiphenyl, m-hydroxybenzoic acid, p-hydroxybenzoic acid, anisic acid, p-ethoxybenzoic acid, p-propoxybenzoic acid, p-benzyloxy benzoic acid, p-phenoxybenzoic acid, gallic acid, anthranilic acid, m-aminobenzoic acid, p-aminobenzoic acid, phthalic acid monoamide, phthalic acid monoanilide, 3-isopropyl-4-hydroxybenzoic acid, 3-sec-butyl-4-hydroxybenzoic acid, 3-cyclohexyl-4-hydroxybenzoic acid, 3-phenyl-4-hydroxybenzoic acid, 3-benzyl-4-hydroxybenzoic acid, 3,5-dimethyl-4-hydroxybenzoic acid, 3,5-dichloro-4-hydroxybenzoic acid, trimellitic acid, pyromellitic acid, α-naphthoic acid, β-naphthoic acid, tetrachlorophthalic acid, 2,2'-dicarboxydiphenyl, salicylic acid, o-cresotinic acid, m-cresotinic acid, p-cresotinic acid, 3-ethylsalicylic acid, 4-ethylsalicylic acid, 3-isopropyl-salicylic acid, 3-sec-butylsalicylic acid, 5-sec-butyl-salicylic acid, 3-tert-butylsalicylic acid, 3-cyclohexyl-salicylic acid, 5-cyclohexylsalicylic acid, 3-phenyl-salicylic acid, 5-phenylsalicylic acid, 3-benzylsalicylic acid, 5-benzylsalicylic acid, 5-tert-octylsalicylic acid, 3-(α-methylbenzyl)salicylic acid, 5-(α-methylbenzyl)-salicylic acid, 3-nonylsalicylic acid, 5-nonylsalicylic acid, 5-(α,α-dimethylbenzyl)-salicylic acid, 3-chlorosalicylic acid, 5-chlorosalicylic acid, 3-hydroxy-salicylic acid, 4-hydroxysalicylic acid, 5-hydroxy-salicylic acid, 6-hydroxy salicylic acid, 3-methoxysalicylic acid, 3-ethoxysalicylic acid, 4-methoxysalicylic acid, 5-methoxysalicylic acid, 5-benzyloxysalicylic acid, 5-octoxysalicylic acid, 3,5-dichlorosalicylic acid, 3-chloro-5-methylsalicylic acid, 3-chloro-5-ethylsalicylic acid, 3-chloro-5-isopropylsalicylic acid 3-chloro-5-tert-butylsalicylic acid, 3-chloro-5-cyclohexylsalicylic acid, 3-chloro-5-phenylsalicylic acid, 3-chloro-5-(α-methylbenzyl)salicylic acid, 3-chloro-5-(α,α-dimethylbenzyl)-salicylic acid, 3-chloro-5-chlorosalicylic acid, 3,5-dimethylsalicylic acid, 3-methyl-5-tert-butylsalicylic acid, 3-isopropyl-5-tert-butylsalicyclic acid, 3-isopropyl-5-cyclohexylsalicylic acid, 3-isopropyl-5-(α-methylbenzyl)-salicylic acid, 3-isopropyl-5-(α,α-dimethylbenzyl)-salicylic acid, 3-sec-butyl-5-tert-butylsalicylic acid, 3-tert-butyl-5-cyclohexylsalicylic acid, 3-tert-butyl-5-(4-tert-butylphenyl)salicylic acid, 3-(4′-tert-octyl-phenyl)-5-tert-octylsalicylic acid, 3-{4′-(α,α-dimethyl-benzyl)-phenyl}-5-(α,α-dimethylbenzyl)salicylic acid, 3,5-di-α-methylbenzylsalicylic acid, 3,5-di-α,α-dimethylvenzylsalicylic acid, 3-phenyl-5-α,α-dimethylbenzylsalicylic acid, 3-hydroxysalicylic acid, 1-hydroxy-2-carboxynaphthalene, 1-hydroxy-2-carboxy-4-isopropylnaphthalene, 1-hydroxy-2-carboxyl-7-cyclohexylnaphthalene, 5-(4′-hydroxybenzyl)salicylic acid, 5-(3′-carboxyl-4′-hydroxybenzyl)salicylic acid and 3-(α,α-dimethylbenzyl)-5-{3′-carboxyl-4′-hydroxy-5-(α,α-dimethylbenzyl)benzyl}salicylic acid.

Polymers of the above mentioned aromatic carboxylic acids with aldehydes or acetylene are also useful.

In addition, various polyvalent metal salts of the above mentioned phenolic compounds and aromatic carboxylic acids (including their polymers with aldehydes or acetylene) are also useful as acceptor. Among the polyvalent metals which can form such metallic salts like this there are included magnesium, aluminum, calcium, titanium, chromium, manganese, iron, cobalt, nickel, copper, zinc, silver, cadmium, tin and barium. Preferred metals are zinc, magnesium, aluminum and calcium.

Among useful inorganic acidic materials as acceptor there may be included activated clay, acid clay, attapulgite, bentonite, colloidal silica, aluminum silicate, magnesium silicate, zinc silicate, tin silicate, calcined kaolin and talc.

The above enumerated acceptors may be used either solely or in combination.

There is no special limitation about the composition ratio of the color former and the acceptor. In case where the combination of a basic colorless chromogenic material with an acidic material is used, the amount of the acceptor is usually within the range of 1 to 50 parts by weight, preferably 4 to 10 parts by weight, per one part by weight of colorless chromogenic material.

The color developing layer of a heat sensitive record material according to the invention may be formed by any conventional method. Typically it may be formed by preparing an admixture of color former and acceptor, pulverizing the admixture into finely divided particles utilizing attritor, sand mill, ball mill or any other pulverizer, preparing a coating composition in which color former particles and acceptor particles are dispersed, adding to the coating composition the above mentioned specified binder and by coating a suitable base sheet with the thus prepared coating composition. After the coating the sheet may be subjected to a calendering step for smoothening the coated surface of the sheet.

In the coating composition various additives may also be added. Among the additives, for example, there are included pigments having a good oil-absorbability in order to prevent the heat-sensitive record material from being stuck in contact with stylus of recording head; surfactants such as sodium dioctylsulfosuccinate and sodium dodecylbenzenesulfonate; ultraviolet ray absorbing agents such as benzophenone derivatives and triazol derivatives; sensitivity moderators such as stearic acid amide, palmitic acid amide and 2,6-diisopropylnaphthalene; releasing agents such as zinc stearate and aluminum stearate; fluorescent dyes and coloring dyes.

As for the base sheet, paper, plastic film, synthetic paper, and metal film may be used, but paper is used most preferably from the economical viewpoint and the coating receptivity. The amount of coating composition applied to form a color developing layer, though not particularly limited, usually is 2–15 g/m$^2$, preferably 3–12 g/m$^2$ on dry basis.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLES 1 TO 5 AND CONTROLS 1 TO 3

(1) Preparation of A liquid:

The following composition was passed through a sand grinder.

| | |
|---|---|
| 2-phenylamino-3-methyl-6-(N-ethyl-N-p-tolyl) aminofluoran | 25 parts |
| stearic acid amide | 10 parts |
| 5% aqueous solution of methylcellulose | 35 parts |
| water | 105 parts |

Pulverization was continued until an average particle size of 3 microns.

(2) Preparation of B liquid:

The following composition was passed through a sand grinder.

| | |
|---|---|
| 4,4′isopropylidene-diphenol (bisphenol A) | 100 parts |
| stearic acid amide | 40 parts |
| 5% aqueous solution of methylcellulose | 140 parts |
| water | 420 parts |

Pulverization was continued until an average particle size of 3 microns.

(3) Making a heat-sensitive record material:

A dispersion was obtained by mixing and agitating the following components:

| | |
|---|---|
| A liquid | 175 parts |
| B liquid | 700 parts |
| silicon oxide ("Syloid No. 74" manufactured by | 100 parts |

-continued

| | |
|---|---|
| Fuji-Davidson Chemical) | |
| styrene-butadiene copolymer latex ("Dow Latex 1571" manufactured by Dow Chemical Company, solid content: 50%) | 70 parts |
| water | 550 parts |

500 parts of 20% aqueous solution of a water-soluble resin which was made from the monomers as shown in Table 1 and neutralized in the neutralization ratio as shown in Table 1 was added to the above dispersion to prepare a coating composition. The coating composition was coated on a base sheet of 50 g/m$^2$ in the weight of an amount of 8.0 g/m$^2$ on dry basis to obtain a heat-sensitive record material.

EXAMPLES 6 TO 10 AND CONTROL 4.

(1) Preparation of A liquid:

The following composition was passed through a sand grinder.

| | |
|---|---|
| crystal violet lactone (CVL) | 25 parts |
| 10% aqueous solution of polyvinyl alcohol | 25 parts |
| water | 75 parts |

Pulverization was continued until an average particle size of 3 microns.

(2) Preparation of B liquid:

The following composition was passed through a sand grinder.

| | |
|---|---|
| 4,4'-cyclohexylidene-diphenol | 80 parts |
| 4,4'-methylidene-diphenol | 20 parts |
| 10% aqueous solution of polyvinyl alcohol | 100 parts |
| water | 300 parts |

Pulverization was continued until an average particle size of 3 microns.

(3) Making a heat-sensitive record material:

A dispersion was obtained by mixing and agitating the following components:

| | |
|---|---|
| A liquid | 125 parts |
| B liquid | 500 parts |
| polyethylene ("Hi-Wax" manufactured by Mitsui Petrochemical Industries, Ltd. Solid content: 20%) | 250 parts |
| kaolin ("Ultra White 90" manufactured by Engelhard Minerals & Chemicals Corporation) | 500 parts |

To the dispersion there was added 800 parts of 20% aqueous solution of a water-soluble resin obtained by copolymerizing the monomers as shown in Table 2 and neutralizing the carboxyl radicals of the resultant copolymer to 70% of magnesium salt and 30% of sodium salt to prepare a coating composition. The coating composition was coated on a base sheet of 50 g/m$^2$ in the weight of an amount of 5 g/m$^2$ on dry basis to obtain a heat-sensitive record material.

The properties of the fourteen heat-sensitive record materials obtained by the above Examples and Controls were examined with the following methods.

All-mark image was recorded on the heat-sensitive record materials with the use of practical heat-sensitive facsimile KB-600 (manufactured by Tokyo Shibaura Electric Co., Ltd.) for one minute. The applied voltage was 19 V, dot density of thermal head was 5 dots/mm and line density was 4 lines/mm. The resultant sticking on the surface was checked. The color density of the obtained images was measured by Macbeth densitometer Model No. RD-100R (manufactured by Macbeth Corporation). As to water resistance, the images were rubbed with the finger wetted with water five times in the same condition and the color density of the rubbed images was measured. Additionally, the brightness of the color developing layer was measured by Hunter multipurpose deflect meter (according to JIS P 8123) to determine the fogging. These results are shown in Table 3.

As shown in Table 3, the heat-sensitive record materials obtained in Examples according to the invention are superior in both of water resistance and continuous recordability and substantially are not fogged.

TABLE 1

| | Monomers (%) | | | | Neutralization ratio of carboxyl radicals (%) | | | |
|---|---|---|---|---|---|---|---|---|
| | styrene | methyl acrylate | methacrylic acid | maleic acid | magnesium | sodium | potassium | ammonium |
| Control 1 | 30 | 10 | 60 | | | 100 | | |
| Control 2 | 30 | 10 | 60 | | 10 | 80 | | |
| Example 1 | 30 | 10 | 60 | | 40 | 60 | | |
| Example 2 | 30 | 10 | 60 | | 70 | 30 | | |
| Example 3 | 50 | 10 | 40 | | 70 | 25 | | |
| Control 3 | 50 | 10 | 40 | | 40 | 25 | | |
| Example 4 | 40 | | | 60 | 50 | 30 | 10 | |
| Example 5 | 50 | | | 50 | 80 | | | 20 |

TABLE 2

| | Monomers (%) | | | | | | |
|---|---|---|---|---|---|---|---|
| | styrene | ethylene | butyl acrylate | methyl-methacrylate | butadiene | acrylic acid | methacyrlic acid |
| Control 4 | 30 | | 10 | 40 | | | 20 |
| Example 6 | 40 | | 10 | 10 | | | 40 |
| Example 7 | 30 | | 10 | | | | 60 |
| Example 8 | | 40 | | | | 60 | |
| Example 9 | | | | 30 | 10 | 60 | |
| Example 10 | | | 30 | | 10 | 60 | |

TABLE 3

| | sticking | color density | water resistance | brightness (%) |
|---|---|---|---|---|
| Control 1 | O | 0.80 | 0.11 | 73 |
| Control 2 | Δ | 0.80 | 0.13 | 70 |
| Example 1 | O | 0.80 | 0.75 | 73 |
| Example 2 | O | 0.81 | 0.79 | 78 |
| Example 3 | O | 0.80 | 0.77 | 72 |

TABLE 3-continued

| | sticking | color density | water resistance | brightness (%) |
|---|---|---|---|---|
| Control 3 | × | 0.81 | 0.70 | 58 |
| Example 4 | O | 0.80 | 0.78 | 73 |
| Example 5 | O | 0.81 | 0.80 | 70 |
| Control 4 | ×× | 0.80 | 0.77 | 70 |
| Example 6 | O | 0.80 | 0.77 | 72 |
| Example 7 | O | 0.80 | 0.75 | 72 |
| Example 8 | O | 0.81 | 0.76 | 70 |
| Example 9 | O | 0.80 | 0.75 | 71 |
| Example 10 | O | 0.80 | 0.75 | 70 |

(Note)

1. Sticking: O Sticking was never found. Δ The sound of sticking was recognized but the color images were stable. × The loud sound of sticking was heard and the change of the color images was recognized. ×× Sticking was very hard. The continuous recording was stopped early, lest the recording head should be damaged..
2. Color density: The larger the number, the higher or more preferable the density.
3. Water Resistance: The larger the number, the fewer the peeling of the color developing layer and the more preferable the water resistance.
4. Brightness: The larger the number, the more superior the brightness and the fewer the fogging.

What we claim is:

1. In a heat-sensitive record material comprising a base sheet and a color developing layer formed on at least one surface of said base sheet, said color developing layer comprising electron donating color forming material and acceptor which is reactive with said color forming material to develop a color, the improvement in said color developing layer further including as a binder water soluble resinous material having carboxyl radicals, at least 35% of said carboxyl radicals neutralized by alkaline materials to form magnesium salt and at least one other salt which is a member selected from the group consisting of sodium salt, potassium salt, ammonium salt and amine salt, 30 to 80% of the total carboxyl radicals existing in the form of magnesium salt and 5 to 70% of the total carboxyl radicals existing in the form of said other salt; wherein said water soluble resinous material having carboxyl radicals comprises a copolymer made by copolymerization of at least one ethylenic monomer, at least one conjugated diolefinic monomer and at least one unsaturated carboxylic acid; and wherein said unsaturated carboxylic acid component comprises 30 to 70% by weight of said copolymer.

2. A heat-sensitive record material as defined in claim 1, in which said electron donating color forming material is colorless chromogenic material and said acceptor is inorganic or organic acidic material.

3. A heat-sensitive record material as defined in claim 1 wherein said salt which is other than magnesium salt is sodium salt or potassium salt.

4. A heat-sensitive record material as defined in claim 1 wherein said ethylenic monomer is selected from the group consisting of linear or branched olefins having 2 to 25 carbon atoms, aromatic vinyl compounds, vinyl cyanide compounds, alkyl acrylates, methacrylates, vinyl ethers, vinyl halides and vinyl acetate.

5. A heat-sensitive record material as defined in claim 4 wherein said ethylenic monomer is selected from the group consisting of linear or branched olefins having 2 to 25 carbon atoms, aromatic vinyl compounds, alkyl acrylates and methacrylates.

6. A heat-sensitive record material as defined in claim 5 wherein said ethylenic monomer is selected from the group consisting of ethylene, styrene, methylacrylate, butyl acrylate and methacrylate.

7. A heat-sensitive record material as defined in claim 1 wherein said conjugated diolefinic monomer comprises a monomer having 4 to 10 carbon atoms and is selected from the group consisting of butadiene, isoprene, chloroprene and piperylene.

8. A heat-sensitive record material as defined in claim 7 wherein said conjugated diolefinic monomer is butadiene.

9. A heat-sensitive record material as defined in claim 1 wherein said unsaturated carboxylic acid is selected from the group consisting of acrylic acid, methacrylic acid, crotonic acid, itaconic acid, maleic acid and fumaric acid.

10. A heat-sensitive record material as defined in claim 9 wherein said unsaturated carboxylic acid is selected from the group consisting of acrylic acid, methacrylic acid and maleic acid.

11. A heat-sensitive record material as defined in claim 1 wherein at least 90% of said carboxyl radicals are neutralized by said alkaline materials.

12. A heat-sensitive record material as defined in claim 11 wherein at least 95% of said carboxyl radicals are neutralized by said alkaline materials.

13. A heat-sensitive record material as defined in claim 1 wherein said water soluble resinous material is in the color developing layer in an amount between 10 and 40% by weight on a dry basis of the total amount of the solid components of said color developing layer.

14. A heat-sensitive record material as defined in claim 13 wherein said water soluble resinous material is in the color developing layer in an amount between 15 to 30% by weight on a dry basis of the total amount of the solid components of said color developing layer.

* * * * *